(12) United States Patent
Chen et al.

(10) Patent No.: US 10,072,763 B2
(45) Date of Patent: Sep. 11, 2018

(54) DOUBLE-PISTON-EFFECT VALVE

(71) Applicant: FORTUNE MFG. CO., LTD., Taipei (TW)

(72) Inventors: Jerome Chin Lung Chen, Richmond (CA); Michael Qiang Li, Edmonton (CA)

(73) Assignee: FORTUNE MFG. CO., LTD., Taipei (TW)

( * ) Notice: Subject to any disclaimer, the term of this patent is extended or adjusted under 35 U.S.C. 154(b) by 0 days.

(21) Appl. No.: 15/440,456

(22) Filed: Feb. 23, 2017

(65) Prior Publication Data

US 2017/0175908 A1    Jun. 22, 2017

Related U.S. Application Data

(63) Continuation-in-part of application No. PCT/CN2015/075042, filed on Mar. 25, 2015.

(30) Foreign Application Priority Data

Aug. 26, 2014    (CN) .......................... 2014 2 0483410

(51) Int. Cl.
| | |
|---|---|
| *F16K 3/02* | (2006.01) |
| *F16K 3/20* | (2006.01) |
| *F16K 5/06* | (2006.01) |
| *F16K 5/16* | (2006.01) |
| *F16K 5/18* | (2006.01) |
| *F16K 5/20* | (2006.01) |
| *F16K 27/06* | (2006.01) |

(52) U.S. Cl.
CPC ............ *F16K 5/201* (2013.01); *F16K 3/0236* (2013.01); *F16K 3/207* (2013.01); *F16K 5/0689* (2013.01);

(Continued)

(58) Field of Classification Search
CPC ........ F16K 3/0227; F16K 3/0236; F16K 3/16; F16K 3/20; F16K 3/207; F16K 5/161;

(Continued)

(56) References Cited

U.S. PATENT DOCUMENTS 3,542,054 A * 11/1970 Works ..................... F16K 5/227
                                                                137/246.22
3,657,783 A *  4/1972 Ellis ........................ F16K 5/0673
                                                                277/370

(Continued)

FOREIGN PATENT DOCUMENTS

| CN | 2557763 Y | 6/2003 |
|---|---|---|
| CN | 201925517 U | 8/2011 |

(Continued)

OTHER PUBLICATIONS

State Intellectual Property Office as the International Searching Authority, International Search Report and Written Opinion for PCT/CN2015/075042, dated Jun. 3, 2015.

*Primary Examiner* — Reinaldo Sanchez-Medina
*Assistant Examiner* — Hailey K Do
(74) *Attorney, Agent, or Firm* — Honigman Miller Schwartz and Cohn LLP; Matthew H. Szalach; Jonathan P. O'Brien

(57) ABSTRACT

A double-piston-effect valve includes two valve seats symmetrically arranged in two valve endcaps at two sides, respectively. A piston ring is arranged on a rear of each of the valve seats, an inner O-ring groove is provided in the piston ring along an inner circumferential direction, an outer O-ring groove is arranged in the piston ring along an outer circumferential direction, an O-ring is fitted in each of the inner O-ring groove and the outer O-ring groove, and two semi-circular notches are symmetrically provided in a protruding portion of the piston ring.

3 Claims, 5 Drawing Sheets

(52) U.S. Cl.
CPC .............. *F16K 5/168* (2013.01); *F16K 5/188* (2013.01); *F16K 5/205* (2013.01); *F16K 27/067* (2013.01)

(58) Field of Classification Search
CPC ........ F16K 5/181; F16K 5/201; F16K 5/0271; F16K 5/0471; F16K 5/0673; F16K 5/0678; F16K 5/0689; F16K 5/168; F16K 5/188; F16K 5/205; F16K 5/207; F16K 5/208
See application file for complete search history.

(56) References Cited

U.S. PATENT DOCUMENTS

| | | | |
|---|---|---|---|
| 4,137,936 A * | 2/1979 | Sekimoto | F16K 5/0673 137/246.22 |
| 4,519,412 A * | 5/1985 | Grazioli | F16K 5/0673 137/315.19 |
| 4,566,672 A * | 1/1986 | Giebeler | F16K 39/06 251/192 |
| 5,533,738 A * | 7/1996 | Hoffmann | F16K 5/205 251/172 |
| 6,082,707 A * | 7/2000 | Hosie | F16K 5/0678 251/172 |
| 6,938,879 B2 * | 9/2005 | Bancroft | F16J 15/164 251/306 |
| 9,249,889 B1 * | 2/2016 | Anderson | F16K 5/0642 |
| 2010/0117019 A1 * | 5/2010 | Hubacek | F16K 5/0668 251/359 |
| 2010/0276620 A1 | 11/2010 | Ezekiel | |

FOREIGN PATENT DOCUMENTS

| | | | |
|---|---|---|---|
| CN | 204140929 U | 2/2015 | |
| GB | 2188710 A | 10/1987 | |
| WO | WO 2013066187 A1 * | 5/2013 | ........... F16K 5/0678 |

* cited by examiner

DOUBLE-PISTON-EFFECT VALVE

CROSS-REFERENCE TO RELATED APPLICATIONS

The present application is a continuation-in-part of International Application No. PCT/CN2015/075042, titled "NOVEL DOUBLE-PISTON-EFFECT VALVE" filed on Mar. 25, 2015, which claims priority to Chinese patent application No. 201420483410.1 titled "NOVEL DOUBLE-PISTON-EFFECT VALVE" filed with the Chinese State Intellectual Property Office on Aug. 26, 2014, the disclosures of which are hereby incorporated by reference in their entirety.

FIELD

The present application relates to a valve, in particular to a double-piston-effect valve.

BACKGROUND

A conventional trunnion ball valve generally employs a single upstream valve seat to obtain the sealing effect, and a downstream valve seat barely has the sealing effect. A double piston effect for a ball valve mainly uses both the upstream and downstream valve seats to obtain the sealing effect. Even though the upstream valve seat fails to seal the valve, the downstream valve seat can still seal the valve; therefore the sealing effect is effectively improved by this method. This method not only improves the sealing effect of the ball valve but also prolongs the working life of the ball valve. The ball valve with this structure has been used in the petroleum industry for years. However, the application of this technology causes the design of the valve seat to be excessively complicated, the assembling and replacement on site to be difficult and the manufacturing cost to be excessively high.

SUMMARY

A double-piston-effect valve is provided according to the present application, which has a better sealing effect and a low cost, and is easy to manufacture, assemble, maintain and replace on site.

The technical solution of the present application is described as follows. A double-piston-effect valve includes a central valve body, a valve ball located in the central valve body, two valve endcaps symmetrically arranged at two opposing sides of the valve ball and engaged with two opposing sides of the central valve body, and two valve seats symmetrically arranged in the two valve endcaps, respectively, and each valve seat is located between the valve ball and the respective valve endcap. A piston ring is arranged on a rear of each of the valve seats, an inner O-ring groove is provided in an inner circumferential surface of the piston ring, an outer O-ring groove is arranged in an outer circumferential surface of the piston ring, a first O-ring is fitted in the inner O-ring groove, a second O-ring is fitted in the outer O-ring groove, and a first side, away from the valve ball, of the piston ring is further provided with an annular protruding portion, and two semi-circular notches are symmetrically provided in the annular protruding portion of the piston ring.

Compared with the conventional technology, the present application has the following advantages. The double-piston-effect valve with this structure is additionally provided with a piston ring on the rear of the valve seat, and the piston ring can automatically adjust according to a high-pressure side. Since there is a pressure difference between the high-pressure side and a low-pressure side, a sealing effect can be realized by a hydrostatic force induced from this differential pressure. Two O-rings, including an inner O-ring and an outer O-ring, are embedded in the piston ring, which can realize a close cooperation between the piston ring and a valve seat insert, and thus no matter which direction the medium flows, the sealing effect can always be realized. The double-piston-effect valve has the following advantages. The design of the valve seat is unsophisticated, and the valve also has an improved sealing effect and a low cost, and is easy to manufacture, assemble, maintain and replace on site. The double-piston-effect valve in the present application simplifies the conventional technology and can be employed in any trunnion ball valve which is applicable for petroleum, industry, land exploration, offshore exploration and production.

DETAILED DESCRIPTION

Figure 1:
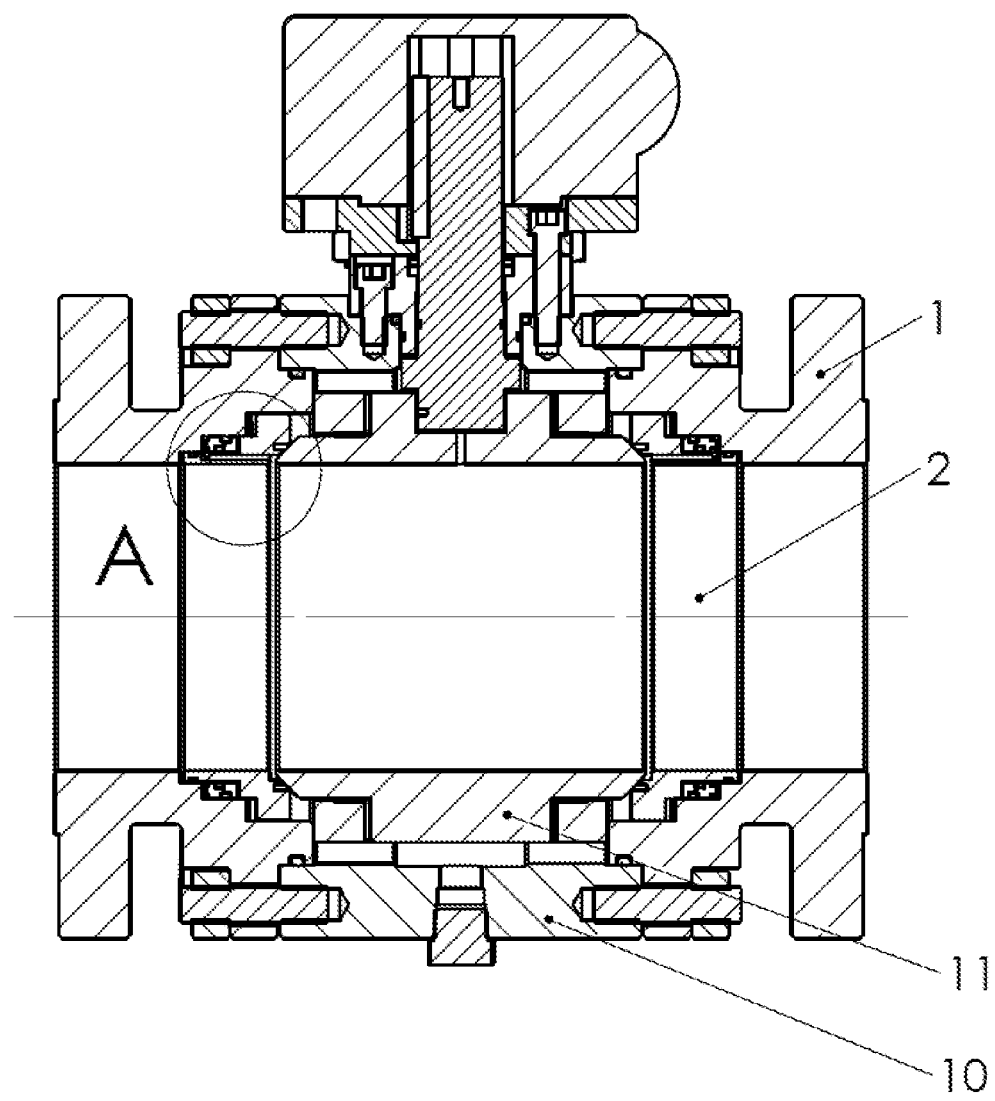
FIG. 1 is a sectional view of a double-piston-effect valve according to an embodiment of the present application.
Figure 2:
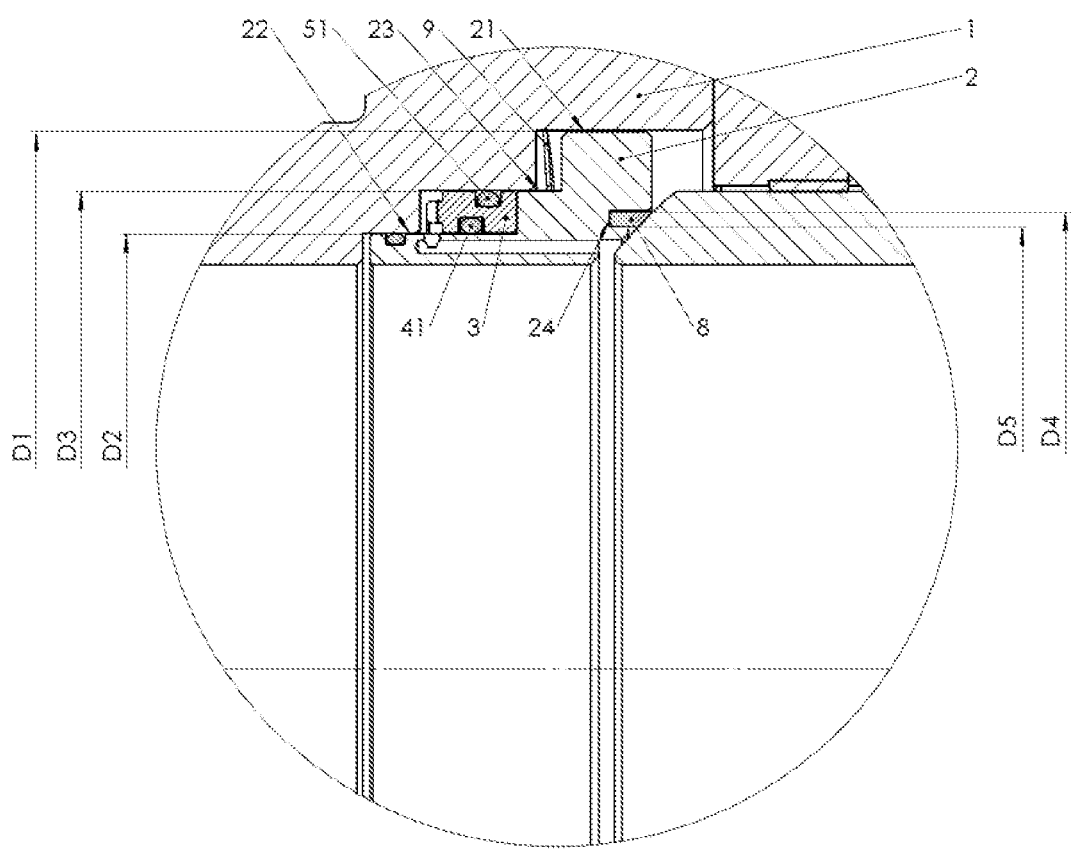
FIG. 2 is an enlarged view of portion A in FIG. 1.

Embodiments of the present application are described in conjunction with the drawings. As shown in FIG. 1, a double-piston-effect valve includes a central valve body 10, a valve ball 11 located in the central valve body 10, and two valve endcaps 1 symmetrically arranged at two opposing sides of the valve ball 11 and engaged with two opposing sides of the central valve body 10. Two valve seats 2 are symmetrically arranged in the two valve endcaps 1, respectively, and each valve seat 2 is located between the valve ball 11 and the respective valve endcap 1. Referring to FIG. 2, the valve seat 2 includes a first section 21 facing the valve ball 11, a second section 22 away from the valve ball 11, and a third section 23 between the first section 21 and the second section 22. A diameter D1 of the first section 21 is greater than a diameter D3 of the third section 23, and the diameter D3 of the third section 23 is greater than a diameter D2 of the second section 22, thus, an outer surface of the valve seat 2, engaged with the valve endcap 1, forms a stepped shape, and accordingly, the valve endcap 1 is provided with a stepped bore to accommodate the valve seat 2.

A piston ring 3 is arranged on a rear of each of the two valve seats 2. Referring to FIG. 2, the piston ring 3 is arranged at a rear side, away from the valve ball 11, of the valve seat 2. Specifically, the piston ring 3 is sleeved on the second section 22 of the valve seat 2, and an inner diameter of the piston ring 3 is greater than the diameter D2 of the second section 22 of the valve seat 2, which allows the piston ring 3 to move freely on the valve seat 2. An inner O-ring groove 4 is provided in an inner circumferential surface of the piston ring 3, and a first O-ring 41 is fitted in the inner O-ring groove 4. An outer O-ring groove 5 is provided in an outer circumferential surface of the piston ring 3, and a second O-ring 51 is fitted in the outer O-ring groove 5. In a preferable solution, the inner O-ring groove 4 and the outer O-ring groove 5 are staggered from each other with respect to the width of the piston ring 3. By staggering the inner O-ring groove 4 from the outer O-ring groove 5, the space of the piston ring 3 is effectively used, which further improves the strength of the piston ring 3, to better meet the strength requirement.

As shown in FIG. 2, a valve seat insert 8 is installed in an end surface 24, facing the valve ball 11, of the valve seat 2. When the valve is assembled, the piston ring 3 is sleeved on the valve seat 2 and the valve seat 2 is fitted into the valve endcap 1, the second O-ring 51 received in the outer O-ring groove 5 engages with an inner surface of the valve endcap 1, and the first O-ring 41 received in the inner O-ring groove 4 engages with the outer surface of the second section 22 of the valve seat 2. In this state, an outer diameter of the second O-ring 51 is greater than an outer diameter D4 of the valve seat insert 8, and an inner diameter of the first O-ring 41 is smaller than an inner diameter D5 of the valve seat insert 8, thus, a bidirectional sealing effect can be realized.

Figure 3:
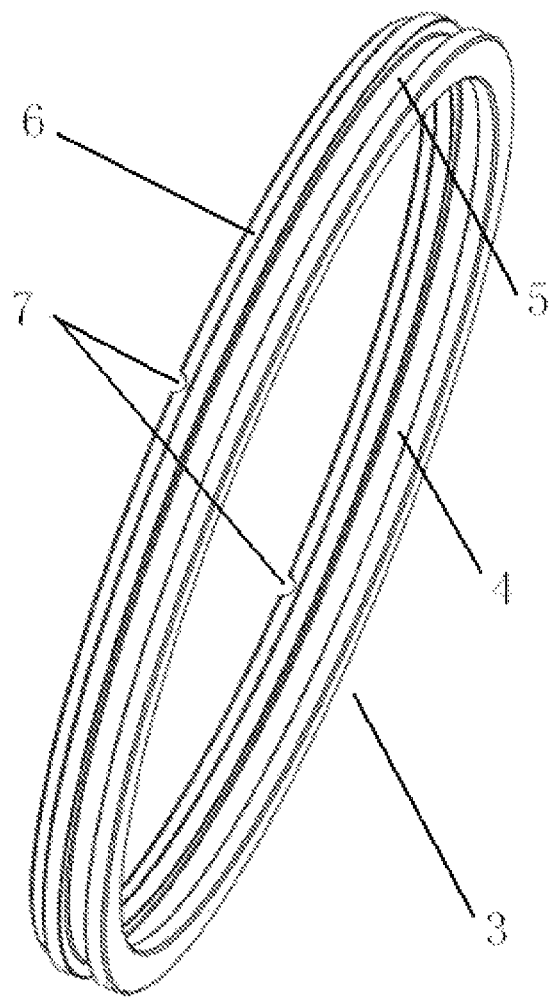
FIG. 3 is a schematic perspective view showing the structure of a piston ring according to the embodiment of the present application.

Referring to FIGS. 2 and 3, an annular protruding portion 6 is provided on the piston ring 3, and two semi-circular notches 7 are symmetrically provided in the annular protruding portion 6, and the two semi-circular notches 7 are configured to keep a grease chamber and a body cavity to be in communication with each other.

Figure 4:
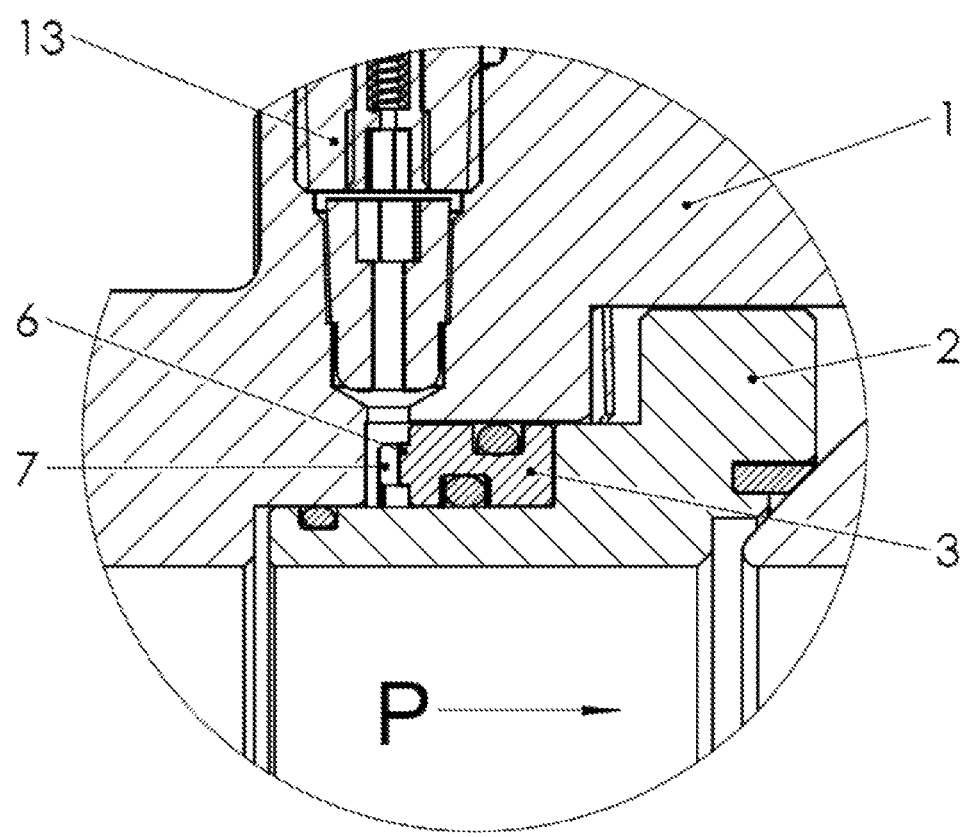
FIG. 4 is a partially sectional view of the double-piston-effect valve with the piston ring located at the right limit position.
Figure 5:
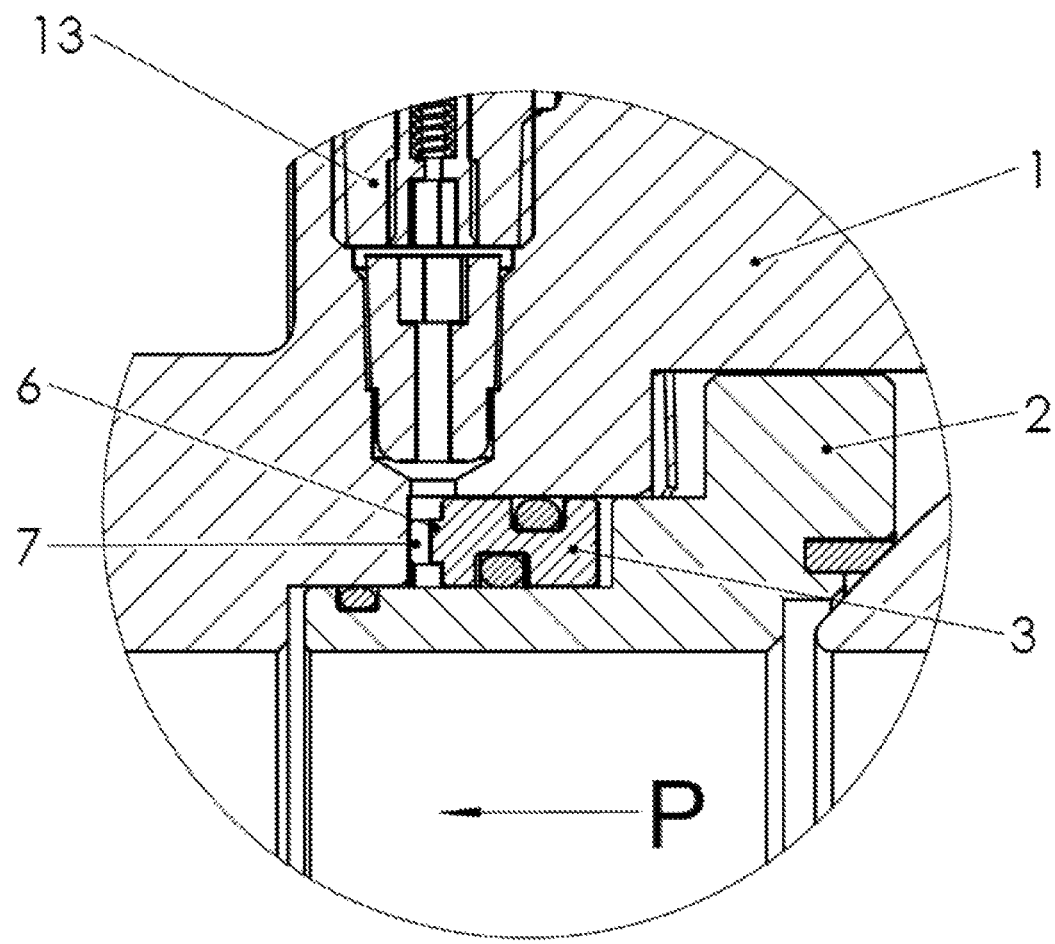
FIG. 5 is a partially sectional view of the double-piston-effect valve with the piston ring located at the left limit position.

In a preferable solution, the annular protruding portion 6 is provided at a first end of the piston ring 3, and when the valve is assembled, the first end of the piston ring 3 is away from the valve ball 11. The first end of the piston ring 3 is further provided with a chamber. Reference is made to FIGS. 4 and 5, in which a grease fitting 13 provided in the valve endcap 1 is shown. In a first state of the working process of the valve as shown in FIG. 4, the direction of hydrostatic load P is rightward, the piston ring 3 moves to the right limit position, a gap is formed between the inner surface of the valve endcap 1 and the first end of the piston ring 3, thus the lubricant can be filled from the grease fitting 1 into a lubricating passage in the valve seat 2 through the gap, the chamber, and the semi-circular notches 7. In a second state of the working process of the valve as shown in FIG. 5, the direction of hydrostatic load P is leftward, the piston ring 3 moves to the left limit position, the first end of the piston ring 3 sits against the inner surface of the valve endcap 1, and in this state, due to the chamber and the semi-circular notches 7 arranged in the piston ring 3, the lubricant can still be filled from the grease fitting 13 into the lubricating passage in the valve seat 2 through the chamber, and the semi-circular notches 7. Therefore, regardless of the direction of hydrostatic load P, the lubricating passage of the valve seat 2 will not be blocked.

The piston ring of the double-piston-effect valve can automatically adjust according to a high-pressure side and realize a sealing effect by utilizing a hydrostatic pressure.

In a further embodiment, again referring to FIG. 2, a spring 9 is provided on the valve seat 2. Specifically, the spring 9 is sleeved on the third section 23 of the valve seat 2, and is configured to provide spring load to energize the valve seat 2 to enable the sealing performance when the hydrostatic pressure is low. When the valve is assembled, the spring 9 is located between the inner surface of the valve endcap 1 and the first section 21 of the valve seat 2. The spring 9 can be embodied as a wave spring or a compression spring, and other types of spring can also be used as long as the spring can provide the required spring load.

The piston ring of the double-piston-effect valve can automatically adjust according to the high-pressure side and realize the sealing effect by utilizing the hydrostatic pressure and spring loads.

The two O-rings, including the inner O-ring and the outer O-ring, are embedded in the piston ring, which can realize a close cooperation between the piston ring and a valve seat insert, and thus no matter which direction the medium flows, the sealing effect can always be realized (that is, the bidirectional sealing effect can be realized).

The above descriptions are only preferable embodiments of the present application. It should be noted that, for those ordinary skilled in the art, a few of modifications and improvements may be made to the present application without departing from the principle of the present application. The scope of protection of the present application is defined by the claims.

What is claimed is:

1. A double-piston-effect valve comprising;
   a central valve body;
   a valve ball located in the central valve body;
   two valve endcaps symmetrically arranged at two opposing sides of the valve ball and engaged with two opposing sides of the central valve body;
   two valve seats symmetrically arranged in the two valve endcaps, respectively,
   wherein each valve seat is located between the valve ball and the respective valve endcap, and each valve seat comprises a first section facing the valve ball, a second section away from the valve ball, and a third section between the first section and the second section, a diameter of the first section is greater than a diameter of the third section, and the diameter of the third section is greater than a diameter of the second section;
   wherein, a piston ring is arranged on a rear of each of the two valve seats, each piston ring sleeved on the second section of the respective valve seat and movable along the second section of the respective valve seat, and a spring is sleeved on the third section of each of the two valve seats;
   wherein an inner O-ring groove is provided in an inner circumferential surface of each piston ring, an outer O-ring groove is arranged in an outer circumferential surface of each piston ring, a first O-ring is fitted in the inner O-ring groove and sits on an outer surface of the second section of the respective valve seat, a second O-ring is fitted in the outer O-ring groove, and a first side, away from the valve ball, of each piston ring is further provided with an annular protruding portion, each annular protruding portion having an outer diameter smaller than an outer diameter of the respective piston ring and defining a grease chamber between the respective piston ring and the respective valve endcap, and two semi-circular notches are symmetrically provided in each annular protruding portion of the respective piston ring and configured to allow lubricant to flow from the grease chamber into a lubricating passage in the respective valve seat; and
   wherein, a valve seat insert is provided in an end surface, facing the valve ball, of each valve seat, and an outer diameter of the second O-ring is greater than an outer diameter of the respective valve seat insert, and an inner diameter of the first O-ring is smaller than an inner diameter of the respective valve seat insert.

2. The double-piston-effect valve according to claim 1, wherein, each spring is a wave spring or a compression spring.

3. The double-piston-effect valve according to claim 1, wherein, the inner O-ring groove and the outer O-ring groove are staggered from each other with respect to a width of the respective piston ring.

* * * * *